(12) United States Patent
Griffin et al.

(10) Patent No.: US 12,363,166 B2
(45) Date of Patent: Jul. 15, 2025

(54) BLOCKCHAIN-DRIVEN DYNAMIC ACCESS CONTROL

(71) Applicant: Red Hat, Inc., Raleigh, NC (US)

(72) Inventors: Leigh Griffin, Waterford City (IE);
Aoife Moloney, Waterford City (IE)

(73) Assignee: Red Hat, Inc., Raleigh, NC (US)

( * ) Notice: Subject to any disclaimer, the term of this patent is extended or adjusted under 35 U.S.C. 154(b) by 533 days.

(21) Appl. No.: 17/672,159

(22) Filed: Feb. 15, 2022

(65) Prior Publication Data

US 2023/0262092 A1    Aug. 17, 2023

(51) Int. Cl.
*H04L 9/40*            (2022.01)
(52) U.S. Cl.
CPC ............ *H04L 63/20* (2013.01); *H04L 63/102* (2013.01); *H04L 63/105* (2013.01)
(58) Field of Classification Search
CPC ...... H04L 63/20; H04L 63/102; H04L 63/105
USPC ......................................................... 726/26
See application file for complete search history.

(56) References Cited

U.S. PATENT DOCUMENTS

| 10,785,167 B2 | 9/2020 | Karame et al. |
| 10,958,436 B2 | 3/2021 | Zhou et al. |
| 2020/0344233 A1 | 10/2020 | Lai et al. |
| 2021/0352077 A1* | 11/2021 | Benedetti .............. H04L 9/3247 |

FOREIGN PATENT DOCUMENTS

| CN | 110348202 B | 6/2020 |
| CN | 109688120 B | 11/2020 |

OTHER PUBLICATIONS

Outchakoucht, Aissam, et al. "Dynamic Access Control Policy Based on Blockchain and Machine Learning for the Internet of Things.", 2017, 8 pages.
Almakhour, Mouhamad, et al. "Trustless Blockchain-Based Access Control in Dynamic Collaboration", Dec. 2018, 7 pages.

* cited by examiner

*Primary Examiner* — Anthony D Brown
(74) *Attorney, Agent, or Firm* — Womble Bond Dickinson (US) LLP

(57) ABSTRACT

Embodiments of the present disclosure include a processing device that receives a proposed block for inclusion on a blockchain, the proposed block including a proposed update to an access control policy and an update condition for evaluating the proposed update, transmits an access request to be evaluated according to a modified version of the access control policy that incorporates the proposed update to generate access results, and transmits a determination for the inclusion of the proposed block on the blockchain in view of the access results.

17 Claims, 6 Drawing Sheets

BLOCKCHAIN-DRIVEN DYNAMIC ACCESS CONTROL

TECHNICAL FIELD

Aspects of the present disclosure relate to access control of networked devices, and more particularly, to mechanisms to dynamically adjust and audit role-based access control mechanisms.

BACKGROUND

Control of access to resources, such as which entities can access which files or services in a computing environment, is important to the security and safety of information maintained in the computing environment. Some computing environments utilize access control systems to secure access to the computing environment.

Access control systems control access to electronic resources, such as files, systems, and network, by entities such as individuals, computing processes, and other systems. Access control systems may incorporate access control policies that identify the resource being protected, the access rights being granted, and the subject that is granted those access rights. Upon an attempted access of the resource, the access control system reviews the access control policies and determines whether the attempted access is to be allowed.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments without departing from the scope of the described embodiments.

DETAILED DESCRIPTION

Figure 1:
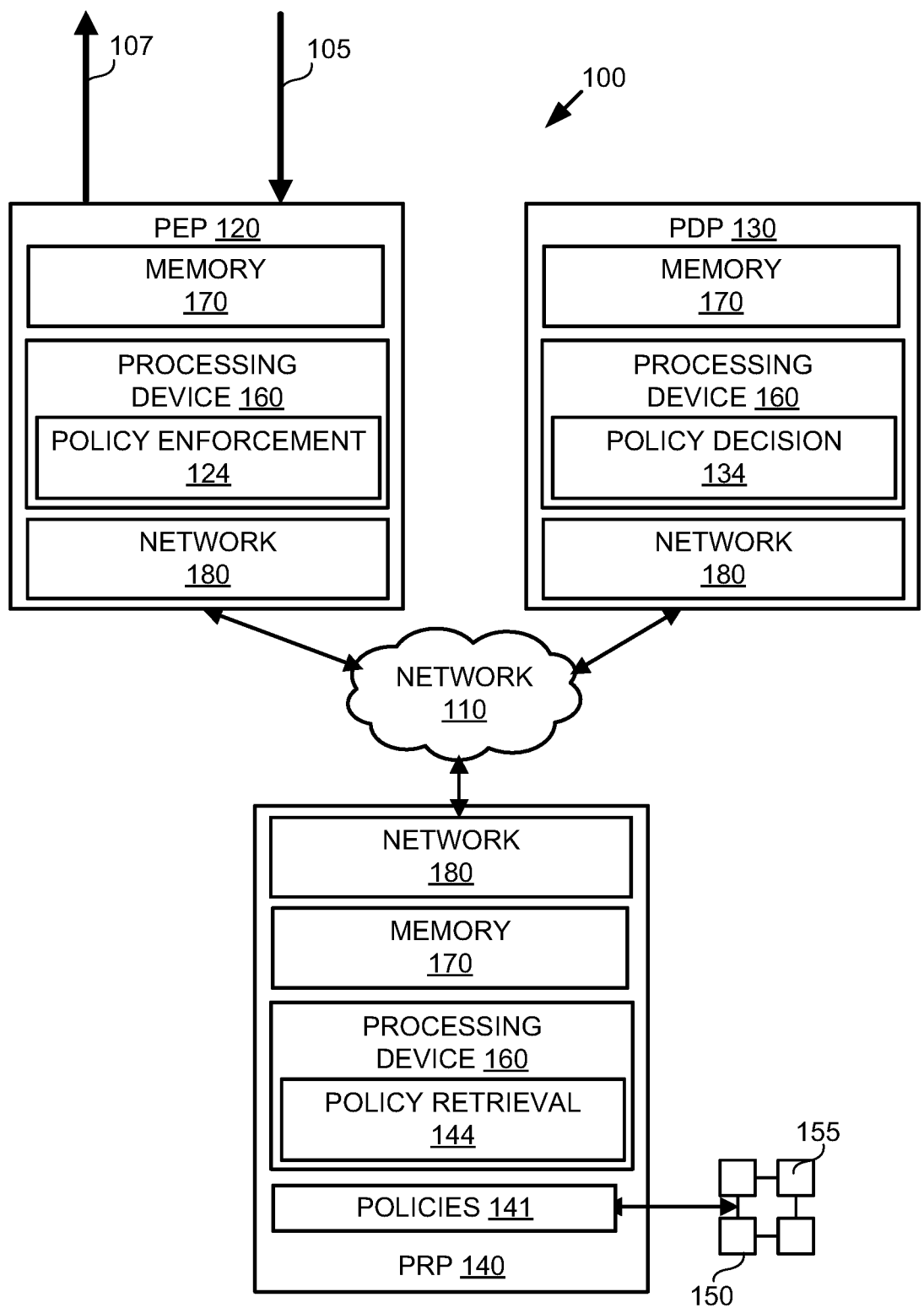
FIG. 1 is a block diagram that illustrates an example of an access control architecture, in accordance with one or more aspects of the present disclosure.

Access control systems include role-based access control (RBAC) which incorporates access control policies based, at least in part, on rights granted to particular roles within the computing environment. RBAC is often very static, with rules defined and loaded in advance to protect assets. In a conventional system, updates to the access control rules involve updating the policies associated with the RBAC, and often involve taking the access control system down so that integrity checks for consistency with other policies can be manually made.

The consistency checks are utilized because the policies being enforced can often be very diverse and complicated. Resources may be protected by a plurality of policies and individual users may hold many different roles, which can lead to multiple interactions between the various policies that can have combinatorial effects. For a given access request from a requestor for a resource, the RBAC system may examine the set of rules in the access policies to determine if the requestor should be approved or denied access to the resource. With many RBAC systems, there is a hierarchy of how to interpret rules that are combined at a system level. Examples of the way a rules set may be interpreted include deny overrides (i.e., if any rule exists that denies access, then access is denied regardless of whether other rules would permit access), permit overrides (i.e., if any rule exists that permits access, then access is permitted regardless of whether other rules would deny access), first applicable (i.e. the first rule that matches a given request controls the access), one applicable (only one of the rules should apply), ordered permit/deny override (a single permit/deny overrides but the rules are analyzed in a specific order), and others. The interaction of the various rules, coupled with the different types of policy techniques, can make it difficult to determine how additions, deletions, or modifications to the policies will actually result.

An example of such a scenario includes a set of mobile phones each running in a computing environment. Each of the phones may have files, services, and/or other resources which are made available to other members of the system and are protected by RBAC. When a new phone joins the system, the files and services on the phone may be made available to others, but may need to equally be protected within the overall system. In addition, the new phone may come with its own set of access policies which need to coexist with the wider policy set within the computing system. If the set of policies for the new phone were simply added and combined in with the existing policies, there are simple edge case examples where a new policy could conflict with an existing policy (e.g., the first applicable matching technique is one example). For example, a user could be denied access based on their individual credentials, but could be granted access based on their role in a group. Moreover, the addition of the new policies could cause an execution path to exist that could lead to the need for policy conflict resolution approaches that combine and layer the policies appropriately. Such conflict resolution approaches may not always work, as they are non-trivial and may require resolution as an offline combinatorial problem. However, in the real world example provided above, the presence of the phone means that a decision must be made whether to accept the phone into the system or deny it access, and solutions which require long lead times (such as offline combinatorial problems) may not be acceptable.

Aspects of the disclosure address the above-noted and other deficiencies by providing a blockchain-based control mechanism for access policies that utilizes smart contracts. Smart contracts automatically execute, control, or document relevant events and actions according to the terms of a contract. Smart contracts can allow for dynamic rule creation and execution by establishing a contract between a resource under protection and a user (or user group) with whom access is to be regulated with the enforcement of that contract only happening when certain conditions are met.

As described further herein, a smart contract service can form an RBAC rule that may impact an existing system or may be applicable for a future resource that may be added. The proposed rule is placed in a public facing ledger (e.g., as a blockchain) based on consensus by node devices within the access environment (e.g., an RBAC environment). The consensus may validate that the proposed rule is valid, is not conflicting with the existing policy set, and is otherwise acceptable to insert within the access policy. In some embodiments, a trigger event may be associated with the contract. The trigger event may be a new resource added, a resource utilization ceiling reached, some defined action having taken place, or other customizable event. When the event occurs, leveraging the blockchain, the nodes of the system that are responsible for accessing resources under observation can view the proposed changes and validate that changes are valid and should be executed. Once consensus is reached, the contract may execute and insert a new RBAC entry into the RBAC policy set.

The embodiments described herein allow for event-based access control where the results of some actions and conditions that may exist outside of the system under protection can influence the RBAC system, by modifying existing RBAC rules or dynamically creating new rules. An added benefit is the increased security through the fact the contracts are immutable by design and therefore can be validated as being valid changes to introduce to the system. This approach allows an RBAC system to be protected by the contracts, but also allows existing RBAC systems the benefit of smart contracts as an enhancement and control mechanism.

FIG. 1 depicts a high-level component diagram of an illustrative example of an access architecture 100, in accordance with one or more aspects of the present disclosure. The access architecture 100 includes one or more policy enforcement points (PEPs) 120, one or more policy decision points (PDPs) 130, and one or more policy retrieval points (PRPs) 140.

The PEP 120 may be configured to receive incoming access request(s) 105 and provide response(s) 107 (e.g., permit/deny) to the requestor. The PEP 120 may include instruction code including a policy enforcement engine 124. The policy enforcement engine 124 of the PEP 120 may be configured to inspect the request 105 and generate an authorization request from it which it sends to the PDP 130. The PEP 120 may also be configured to provide the response 107 to the requestor based on a permit/deny decision provided by the PDP 130.

The PDP 130 may be configured to evaluate the request 105 received from the PEP 120 against the access control policies 141 of the access architecture 100. The PDP 130 may include instruction code including a policy decision engine 134. The policy decision engine 134 of the PDP 130 may be configured to return the permit/deny decision to the PEP 120 based on the access control policies 141. For example, the PDP 130 may return a deny decision to the PEP 120 if the access control policies 141 indicate that the provided request 105 (e.g., the resource being requested and the entity/role making the request) should not be granted (e.g., access to the resource should be denied). Similarly, the PDP 130 may return a permit decision to the PEP 120 if the access control policies 141 indicate that the provided request 105 (e.g., the resource being requested and the entity/role making the request) should be granted (e.g., access to the resource should be permitted).

The PRP 140 may be configured to store the access control policies 141. The PRP 140 may be a storage system or other file system connected to the PEP 120 and the PDP 130. The PRP 140 may include instruction code including a policy retrieval engine 144. The policy retrieval engine 144 of the PRP 140 may be configured to examine the access control policies 141 to determine if a match exists between the elements of the request 105 (e.g., the resource being requested and the entity/role making the request) and the access control policies 141. Any matching entries in the access control policies 141 may be provided to the PDP 130 and/or the PEP 120. As will be described further herein, the access control policies 141 of the PRP 140 may be based on and/or refer to a blockchain 150. As used herein, the term "and/or" includes any and all combinations of one or more of the associated listed items.

The PEP 120, PDP 130, and the PRP 140 may include one or more processing devices 160, memory 170, which may include volatile memory devices (e.g., random access memory (RAM)), non-volatile memory devices (e.g., flash memory) and/or other types of memory devices, and one or more network interfaces 180. In certain implementations, memory 170 may be non-uniform access (NUMA), such that memory access time depends on the memory location relative to processing device 160. It should be noted that although, for simplicity, a single processing device 160 is depicted in each of the PEP 120, PDP 130, and the PRP 140 depicted in FIG. 1, other embodiments of the PEP 120, PDP 130, and the PRP 140 may include multiple processing devices, storage devices, or other devices.

Processing device 160 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 160 may also include one or more special-purpose processing devices such as an application specific integrated circuit (ASIC), a field programmable gate array (FPGA), a digital signal processor (DSP), network processor, or the like. Different ones of the PEP 120, PDP 130, and the PRP 140 may have different types of processing device 160.

The PEP 120, PDP 130, and the PRP 140 may be a server, a mainframe, a workstation, a personal computer (PC), a mobile phone, a palm-sized computing device, a virtual instance of a computing device, etc. In some embodiments, one or more of the PEP 120, PDP 130, and the PRP 140 may be an internet-of-things (IoT) device.

In some embodiments, the PEP 120, PDP 130, and the PRP 140 may be directly or indirectly communicatively coupled through one or more of the network interfaces 180. For example, the PEP 120, PDP 130, and the PRP 140 may be coupled to each other (e.g., may be operatively coupled, communicatively coupled, may communicate data/messages with each other) via network 110. Network 110 may be a public network (e.g., the internet), a private network (e.g., a local area network (LAN) or wide area network (WAN)), or a combination thereof. In one embodiment, network 110 may include a wired or a wireless infrastructure, which may be provided by one or more wireless communications systems, such as a WIFI® hotspot connected with the network 110 and/or a wireless carrier system that can be implemented using various data processing equipment, communication towers (e.g., cell towers), etc. The network 110 may carry communications (e.g., data, message, packets, frames, etc.) between the various components of the PEP 120, PDP 130, and the PRP 140.

Though FIG. 1 illustrates the PEP 120, PDP 130, and the PRP 140 are separate entities, it will be understood that the embodiments of the present disclosure are not limited to such a configuration. In some embodiments, the PEP 120, PDP 130, and the PRP 140 may be combined into a single system. For example, in some embodiments, each of the policy enforcement engine 124, the policy decision engine 134, and the policy retrieval engine 144 may be executed on one or more processing devices 160 of a single server, virtual machine, or other computational system. The separation of the elements of FIG. 1 are to aid in understanding the present disclosure and are not intended to limit the embodiments thereof.

As described herein, the access control policies 141 of the PRP may be based on and/or reference the blockchain 150. The blockchain 150 is a linked list of records, called blocks 155, that are linked together, in part, using cryptography. Each block 155 contains a cryptographic hash of the previous block 155, a timestamp, and transaction data. As blocks 155 each contain information about the block 155 previous to it, they form a chain, with each additional block 155 reinforcing the ones before it. Therefore, blockchains 150 are resistant to modification of their data because once recorded, the data in any given block 155 cannot be altered retroactively without altering all subsequent blocks 155.

In some embodiments, the blockchain 150 is provided as a distributed ledger that may be managed by a peer-to-peer network, where nodes collectively adhere to a protocol to communicate and validate new blocks 155. The various nodes of the peer-to-peer network may use consensus to validate whether a new block may be added to the blockchain 150. Consensus is used to determine whether the new block 155 is valid. For example, a consensus algorithm may be used to allow all of the the peers of the blockchain 150 to reach a common agreement about the present state of the distributed ledger. In this way, consensus algorithms achieve reliability in the blockchain 150. For example, the consensus algorithm ensures that every new block 155 that is added to the blockchain 150 is agreed upon by a subset of the nodes in the blockchain 150 to be valid. In some embodiments, the subset may be all, some, or a majority of the nodes of the blockchain 150, but is typically greater than 50%.

In some embodiments, the blockchain 150 may be formed of one or more blocks 155 including a smart contract. As will be described in further detail herein, blockchain-based smart contracts are proposed contracts that can be partially or fully executed or enforced without human interaction. For example, the contents of the smart contract on the blockchain 150 may include executable code. The executable code may be configured to execute when certain conditions, also defined in the smart contract, are met. In some embodiments, the executable code may be Turing-complete, meaning that the executable code is capable of solving any reasonable computational problem. However, the embodiments of the present disclosure are not limited to blockchains 150 that include Turing-complete blocks.

The blockchain 150 may include blocks 155 that each define elements and/or modifications to the access control policies 141. By defining the access control policies 141 via the blockchain 150, the modifications and/or structure of the access control policies 141 may be publicly visible. Moreover, as will be described further herein, the consensus mechanisms used to add blocks 155 to the blockchain 150 may be leveraged to validate changes to the access control policies 141 by the major stakeholders of the access architecture 100. More specifically, before being added to the blockchain 150, a proposed modification to the access control policies 141 may be validated by one or more nodes access architecture 100 such that potential issues may be identified before the proposed modification to the access control policies 141 is finalized. The number of nodes that must agree and/or provide consensus for the addition of the proposed modification to be added to the blockchain 150 may be configurable. In some embodiments, a simple majority (e.g., greater than 50%) of the nodes must agree to add the proposed modification to the blockchain 150. In some embodiments, almost all (e.g., greater than 90%) of the nodes must agree to add the proposed modification to the blockchain 150.

Figure 2:
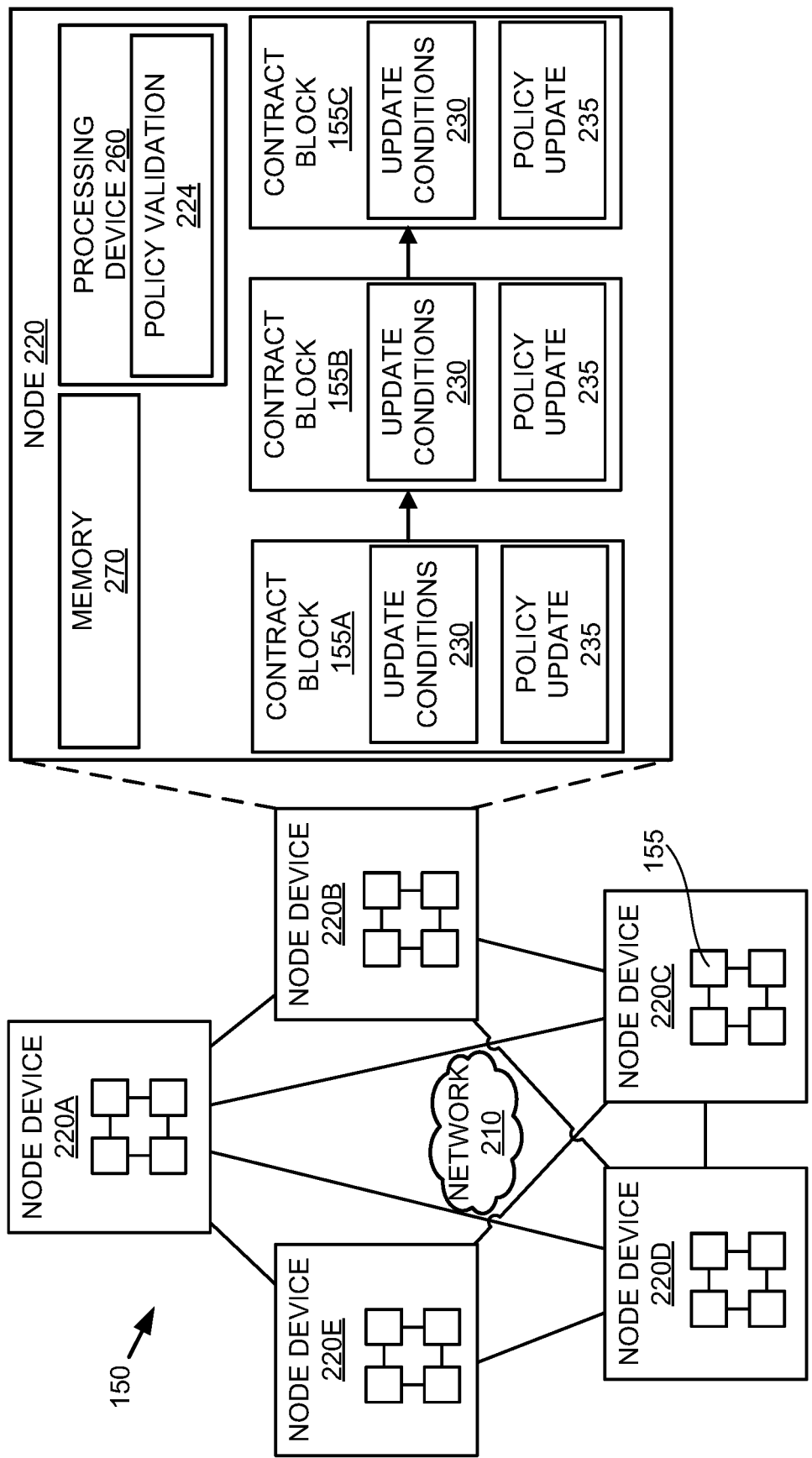
FIG. 2 is a schematic diagram illustrating an example configuration of a blockchain infrastructure, in accordance with one or more aspects of the present disclosure.

FIG. 2 is a schematic diagram illustrating an example configuration of the blockchain 150, in accordance with one or more aspects of the present disclosure. FIG. 2 and the other figures may use like reference numerals to identify like elements. A letter after a reference numeral, such as "220A," indicates that the text refers specifically to the element having that particular reference numeral. A reference numeral in the text without a following letter, such as "220," refers to any or all of the elements in the figures bearing that reference numeral.

Referring to FIGS. 1 and 2, a plurality of node devices 220 may be interconnected and/or grouped into a blockchain 150. Each of the node devices 220 may include a copy of the linked list of the blocks 155 of the blockchain 150. For example, as illustrated in FIG. 2, the blockchain 150 may include node devices 220A, 220B, 220C, 220D, and 220E. The number of node devices 220 in the blockchain 150 illustrated in FIG. 2 is merely an example, and is not intended to limit the embodiments of the present disclosure.

The plurality of node devices 220 may be coupled directly and/or indirectly connected within a network 210. The plurality of node devices 220 may each include one or more network interfaces (e.g., similar to network interfaces 180 in FIG. 1). The node devices 220 are connected in a non-hierarchical peer-to-peer network as part of the blockchain 150.

FIG. 2 illustrates a detailed view of one of the node devices 220 (e.g., 220B), which is intended to explain example operations of the blockchain 150 in accordance with some embodiments of the present disclosure. The detailed view of the node device 220 is merely schematic, and it not intended to limit the various embodiments of the disclosure.

The node device 220 may include one or more processing devices 260 and memory 270, which may include volatile memory devices (e.g., random access memory (RAM)), non-volatile memory devices (e.g., flash memory) and/or other types of memory devices. In certain implementations, memory 270 may be non-uniform access (NUMA), such that memory access time depends on the memory location relative to processing device 260. It should be noted that although, for simplicity, a single processing device 260 is depicted in the node device 220 depicted in FIG. 2, other embodiments of the node device 220 may include multiple processing devices, storage devices, or other devices.

Processing device 260 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 260 may also include one or more special-purpose processing devices such as an application specific integrated circuit (ASIC), a field programmable gate array (FPGA), a digital signal processor (DSP), network processor, or the like.

The node device 220 may be a server, a mainframe, a workstation, a personal computer (PC), a mobile phone, a palm-sized computing device, a virtual instance of a computing device, etc. In some embodiments, the node device 220 may be IoT device.

The node device 220 may include a copy of the linked list of blocks 155 of the block chain 150. The blockchain 150 may include a plurality of linked contract blocks 155. For example, as illustrated in FIG. 2, the blockchain 150 may include contract blocks 155A, 155B, and 155C. The number of contract blocks 155 in the blockchain 150 illustrated in FIG. 2 is merely an example, and is not intended to limit the embodiments of the present disclosure.

Each of the contract blocks 155 may include update conditions 230 (also referred to herein as conditions) and a policy update 235. In some embodiments, each of the contract blocks 155 may be a smart contract. A smart contract is executable computer code that specifies an action that may be performed when one or more of the update conditions 230 precedent are met. Once the update conditions 230 are met, the action of the smart contract (e.g., the policy update 235) may be automatically carried out by executing one or more operations specified by smart contract code. In some embodiments, the policy update 235 may contain the code to be executed to perform the policy update 235. In this manner, the smart contract enables automatic verification and performance of an agreement or transaction. In the example of FIG. 2, the policy update 235 includes the executable code to perform the action and the update conditions 230 include the update conditions 230 which must be met before the policy update is executed. In some embodiments, the update conditions 230 may also include executable code that may be executed to determine whether the update conditions 230 have been met. For example, executable code of the update conditions 230 may return a logical true or logical false value that indicates whether the update conditions 230 have been met.

In some embodiments, the policy update 235 may include one or more updates that are to be made to the access control policies 141 of the access architecture 100. For example, the policy update 235 may include the addition of a policy, resource, and/or access permission to the access control policies 141, a modification to an existing policy, resource, and/or access permission, and/or a deletion of an existing policy, resource, and/or access permission. For example, the policy update 235 may include providing access to a new role or user within the access control policies 141, modifying an existing role within for an existing role or user within the access control policies 141, and/or deleting a role or user from the access control policies 141.

In some embodiments, the entire set of access control policies 141 may be constructed from the contract blocks 155. For example, by traversing the blockchain 150 from beginning to end (e.g., by following the linked list of blocks 155 in order), the entire set of access control policies 141 of the access architecture 100 may be generated. For example, initial contract blocks 155 may create new entries within the access control policies 141, and later blocks 155 (e.g., farther down the linked list) in the blockchain 150 may modify and/or delete entries within the access control policies 141. Thus, the current state of the access control policies 141, as well as the transactions by which the current state was achieved, are visible by scanning the blockchain 150.

In some embodiments, the update conditions 230 of the contract block 155 may include update conditions 230 for verification of the policy update 235. For example, the update conditions 230 may include executable code to be executed by one or more node devices 220 to verify that the policy update 235 is valid. Verifying that the policy update 235 is valid may include validating that access to the access architecture 100 works as expected (e.g., accesses which are to be granted are actually granted, and accesses which are to be denied are actually denied).

In some embodiments, before a contract block 155 is added to the blockchain 150, each of the node devices 220 must attempt validation of the proposed policy update 235 (e.g., using the update conditions 230). A node device 220 may signal whether the proposed policy update 235 is valid by voting for the contract block 155 to be added to the blockchain 150. If enough node devices 220 vote to add the contract block 155 to the blockchain 150 (and thus signal that they have validated its functionality), the contract block 155 may be added to the blockchain 150. In some embodiments, the number of node devices 220 that must vote to approve the contract block 155 may be configurable. For example, in some embodiments, 90% or higher of the node devices 220 must vote to include the contract block 155 before it is added to the blockchain 150. Voting to include or deny the contract block 155 may include transmitting a determination as to whether the contract block 155 should be included in the blockchain 150 to other ones of the node devices 220 on the blockchain 150.

The addition of the contract block 155 may result in the policy update 235 of the contract block 155 being added to the access control policies 141. In some embodiments, the policy update 235 may be applied to a copy of the access control policies 141 (e.g., on the PRP 140). In some embodiments the access control policies 141 of the PRP 140 may reference the blockchain 150, and any accesses of the PRP 140 to the access control policies 141 may be made by referencing, and traversing, the blockchain 150. For example, in some embodiments, the PRP 140 may generate the access control policies 141 by traversing the blockchain 150.

As described herein, the update conditions 230 of a contract block 155 may indicate the validations that are to be performed to validate the contract block 155. For example, the update conditions 230 may indicate the type(s) of access that should be attempted and the results that should be expected. In some embodiments, different ones of the node devices 220 may be indicated to perform different ones of the update conditions 230. For example, different ones of the node devices 220 may include different types of roles, users, and/or resources. By having different node devices 220 represented in the blockchain 150, each performing different types of access against the access control policies 141, a more robust validation of the proposed policy update 235 may be performed.

In some embodiments, the node device 220 may execute a policy validation engine 224 (e.g., by processing device 260) that validates a proposed policy update 235 of a contract block 155. The policy validation engine 224 may be configured to examine a proposed contract block 155 to determine whether to vote for its inclusion in the blockchain 150. For example, the policy validation engine 224 may be configured to analyze the update conditions 230 of the contract block 155 and execute one or more code instructions therein to validate the policy update 235. In some embodiments, if the results of the execution of the update conditions 230 match the expected results (which may be provided as part of the update conditions 230), then the node device 220 may vote (e.g., by transmission to the other node devices 220 of the network 210) to include the proposed contract block 155.

Figure 3:
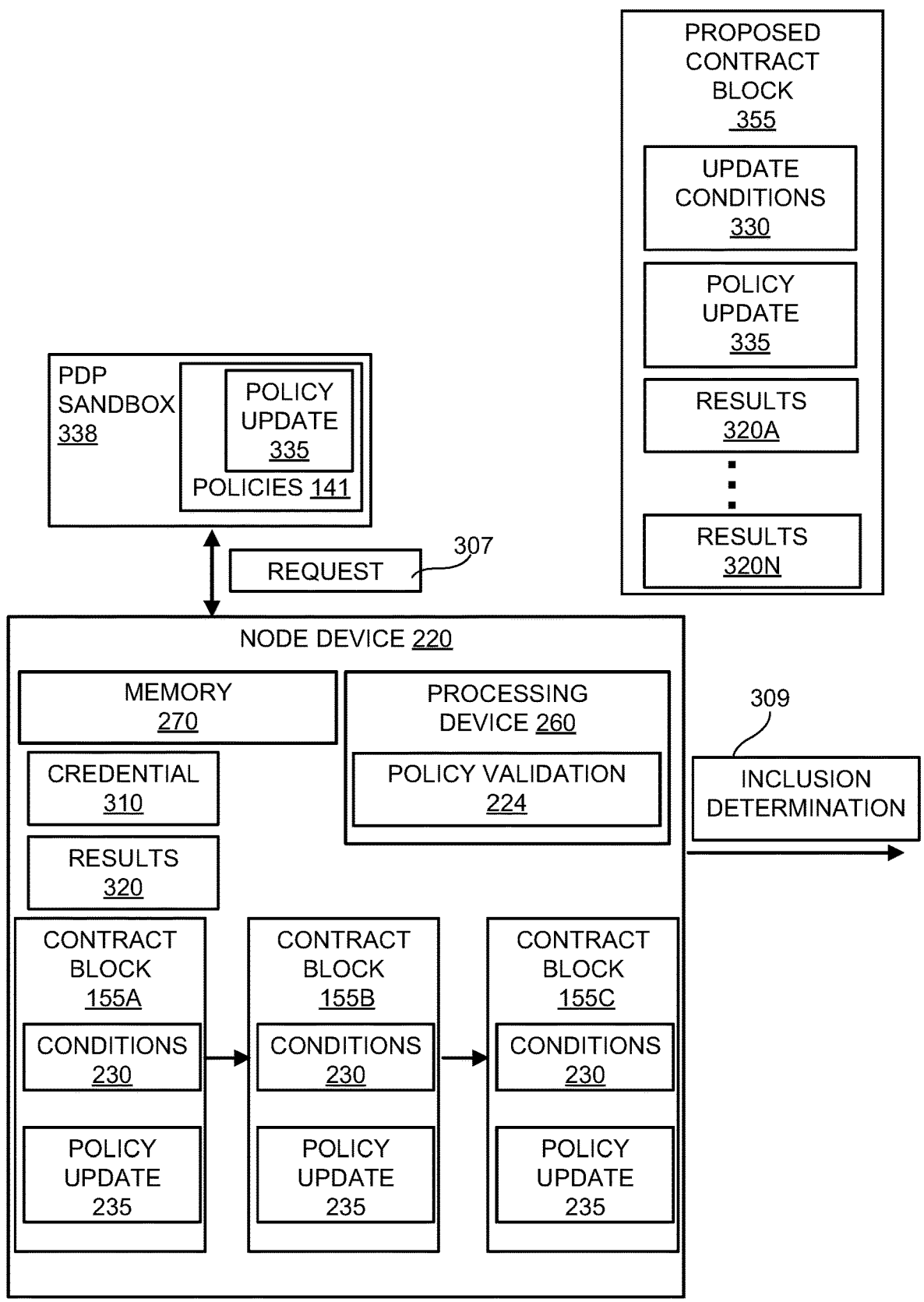
FIG. 3 is a schematic diagram illustrating an example scenario of validating a proposed contract block for addition in the blockchain, in accordance with one or more aspects of the present disclosure.

FIG. 3 is a schematic diagram illustrating an example scenario of validating a proposed contract block 155 for addition in the blockchain 150, in accordance with one or more aspects of the present disclosure.

In FIG. 3, an update to the access control policies 141 (see FIG. 1) has been proposed. The proposed update to the access control policies 141 has been provided as a policy update 335 as part of a proposed contract block 355. The proposed contract block 355 is provided to the node devices 220 for inclusion on the blockchain 150, and thus to the access control policies 141. The proposed contract block 355 further includes update conditions 330. The update conditions 330 include executable code and/or instructions that may be used by the node device 220 to validate the policy update 335.

Referring to FIGS. 1 to 3, the policy validation engine 224 may analyze the update conditions 330 of the proposed contract block 355. In some embodiments, the update conditions 330 may include a plurality of access attempts to be performed by the node device 220 (e.g., against the PDP 130).

In some embodiments, as part of the validation, the PDP 130 may include a PDP sandbox 338 that includes the existing access control policies 141 as modified by the policy update 335. The PDP sandbox 338 may act as a temporary set of policies for validating access against which a request may be analyzed. The PDP 130 may analyze an incoming request with respect to the PDP sandbox 338 to determine if the request would be granted access in the access control policies 141 that are updated by the policy update 335. In some embodiments, the PDP sandbox 338 may be used to generate an access control decision (e.g., a grant or deny) that are not to be followed by actual access. Stated another way, the PDP sandbox 338 may be used solely for generating a simulated grant or deny to a particular request that does not allow actual access to the underlying resource being protected. In this way, the PDP sandbox 338 may be used to validate what results would be provided for a given request so that the operation of the policy update 335 can be tested.

As part of the validation operation, the policy validation engine 224 may transmit a request 307 to the PDP 130 requesting access to a particular resource. In some embodiments, the resource requested, or other facets of the request 307 may be provided according to the update conditions 330 of the proposed contract block 355. In some embodiments, the request 307 to the PDP sandbox 338 (e.g., by way of the PDP 130) may provide a set of credentials 310. For example, the update conditions 330 may include executable code for the node device 220 to attempt to access a potential resource of the access architecture 100, and an expected result (e.g., pass/fail) for the access. The node device 220 may collect the results 320 from the accesses outlined by the update conditions 330 to the PDP sandbox 338. If the results 320 are satisfactory (e.g., match the results indicated in the update conditions 330 such that a grant decision was provided by the PDP sandbox 338 when a grant decision was expected and/or a deny decision was provided by the PDP sandbox 338 when a deny decision was expected), the node device 220 may vote and/or determine to include the proposed contract block 355 in the blockchain 150. If the results 320 are unsatisfactory (e.g., do not match the results indicated in the update conditions 330 such that a grant decision was provided by the PDP sandbox 338 when a deny decision was expected and/or a deny decision was provided by the PDP sandbox 338 when a grant decision was expected), the node device 220 may vote to exclude the proposed contract block 355 from the blockchain 150. In FIG. 3, the vote is illustrated as the transmission of the inclusion determination 309 that includes a determination as to whether the proposed block 355 should be included in the blockchain 150.

As part of the voting process, the node device 220 may include the results 320 in the proposed contract block 355, which is illustrated as results 320A in the proposed contract block 355. In this way, the results 320 of the update conditions 330 may be publicly visible. Thus, if the proposed contract block 355 is added to the blockchain 150, the results 320 that resulted in its addition may be audited. Similarly, if the proposed contract block 355 is excluded from the blockchain 150, the reasons for this exclusion may be apparent.

It will be understood that the analysis of the proposed contract block 355 for a single node device 220 illustrated in FIG. 3 may be repeated by each of the plurality of node devices 220 carrying the distributed copy of the blockchain 150. Different ones of the node devices 220 may include different sets of credential 310. In some embodiments, different ones of the node devices 220 may execute different portions of the update conditions 330 of the proposed contract block 355. For example, the update conditions 330 of the proposed contract block 355 may include different update conditions 330 for different ones of the node devices 220 and/or credentials 310. In addition, each of the node devices 220 that executes the update conditions 330 of the proposed contract block 355 against the policy update 335 may include a separate set of results 320, illustrated in FIG. 3 as results 320A to 320N. In this way, the validation results for all of the node devices 220 that participated in the validation of the proposed policy update 335 are publicly visible as part of the blocks 155 of the blockchain 150.

In FIG. 3, it is illustrated that the node device 220 that includes the contract blocks 155 of the blockchain 150 also executes the policy validation engine 224. However, the embodiments of the present disclosure are not limited to this configuration. In some embodiments, separate devices, users, or resources may perform the validation of the policy update 335, and the results 320 may be provided to the node device 220 for use in determining whether the proposed contract block 355 should be included in the blockchain 150 (and for providing the results 320 into the blockchain 150).

By utilizing the distributed validation technique of the proposed policy update 335, and memorializing this validation within the blockchain 150, some embodiments of the present disclosure generate multiple technological improvements. For example, the distributed execution of the validation of the policy update 335 allows for the detection of complex interactions within the access control policies 141 that might occur through the addition of the policy update 335. By testing the actual results 320 against the expected results provided as part of the update conditions 330, any anomalies in the policy update 335 may be detected before the proposed contract block 355 is added (and thus the access control policies 141 are changed). Moreover, the change to the access control policies 141 is immutable and capable of being readily audited. As every change is in the blockchain 150, as well as which node devices 220 voted for the inclusion of the proposed policy update 335 and the results which prompted this vote, the entire set of access control policies 141 may be easily analyzed for security and/or functionality issues. The embodiments of the present disclosure extend beyond the conventional policy combination approaches by having the individual node devices 220 vote on whether the policy update 335 being proposed to integrate with the access control policies 141 works for their intended access and works with the overall access architecture 100. If the policy update 335 works with the majority of node devices 220, the addition of the proposed contract block 355 can pass the vote and be allowed to join the blockchain 150. However, for node devices 220 where conflicts were detected, the collected results 320 can be used to attempt application of in-flight policy combinatorial effects (which could be specified in update conditions 330 of the proposed contract block 355) to attempt to correct the conflict. In such situations, a new policy update 335 may be generated that addresses the conflict, and a new proposed contract block 355 may be generated. If the attempt to address the conflict fails, it will be apparent which node devices 220 and which policy updates 335 generate conflicts and which are compliant.

Figure 4:
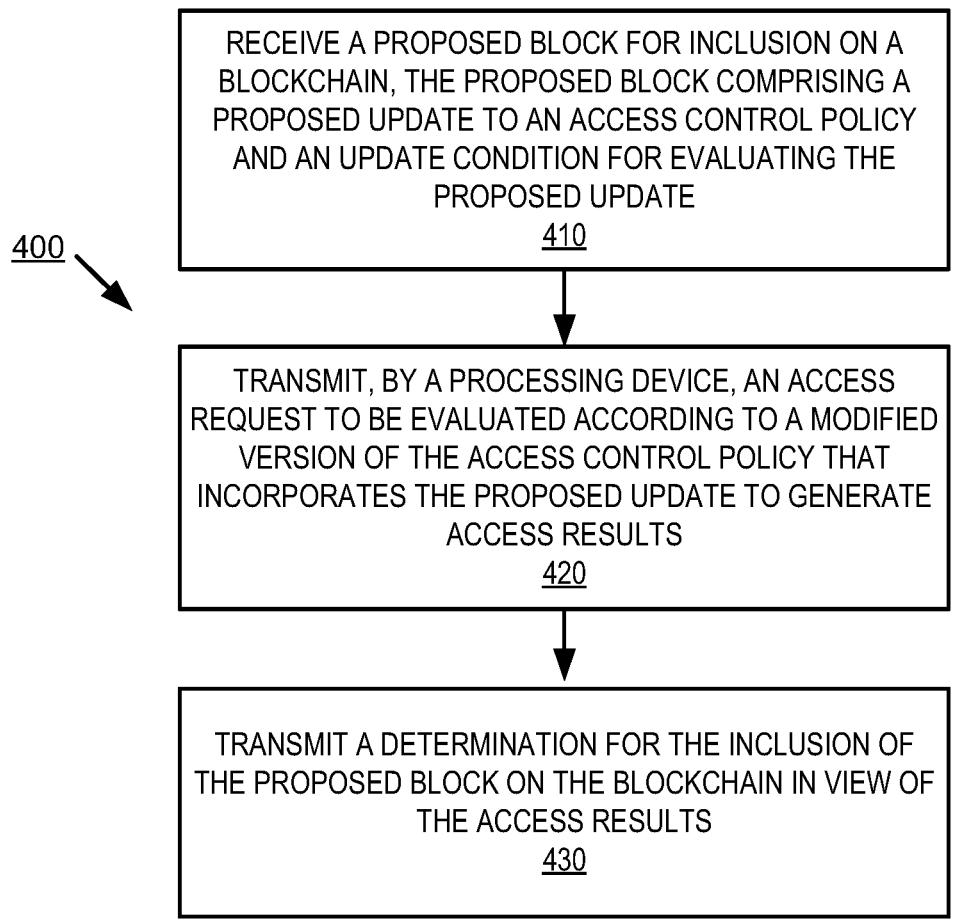
FIG. 4 is a flow diagram of a method of validating access control, in accordance with one or more aspects of the disclosure.

FIG. 4 is a flow diagram of a method 400 of access control, including validating changes to access control policies, in accordance with one or more aspects of the disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed node device 220 (e.g., by the policy validation engine 224 executing on the processing device 260) of at least FIG. 3.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Method 400 begins at block 410, where the processing logic receives (e.g., at a node device) a proposed block for inclusion on a blockchain, the proposed block including a proposed update to an access control policy and an update condition for evaluating the proposed update. The node device may be, for example, similar to the node devices 220 discussed herein with respect to FIGS. 1-3. The proposed block and blockchain may be, for example, similar to proposed contract block 355 and blockchain 150 discussed herein with respect to FIGS. 1-3. The proposed update to the access control policy and the update condition for evaluating the proposed update may be similar to the policy update 335 and update conditions 330, respectively, discussed herein with respect to FIGS. 1-3.

At block 420, the processing logic transmits (e.g., using a processing device of the node device) an access request to be evaluated according to a modified version of the access control policy that incorporates the proposed update to generate access results. The access request may be, for example, similar to the request 307 discussed herein with respect to FIGS. 1-3. The access results may be, for example, similar to the results 320 discussed herein with respect to FIGS. 1-3. The modified version of the access control policy that incorporates the proposed update may be, for example, similar to the PDP sandbox 338 discussed herein with respect to FIGS. 1-3. In some embodiments, the access request is generated according to the update condition of the proposed block. In some embodiments, the update condition of the proposed block includes executable code to be executed by the processing device of the node device to generate the access request. In some embodiments, the node device may further update the proposed block with the access results (e.g., in view of the update condition and the proposed update of the proposed block). In some embodiments, transmitting the access request includes transmitting the access request to a server, such as the PDP server 130 discussed herein with respect to FIGS. 1-3, that compares the access request to the modified version of the access control policy that incorporates the proposed update.

At block 430, the processing logic transmits a determination for the inclusion of the proposed block on the blockchain in view of the access results. The determination for the inclusion of the proposed block may be, for example, similar to the inclusion determination 309 (also described herein as a vote) discussed herein with respect to FIGS. 1-3. In some embodiments, the update condition of the proposed block includes expected access results, and transmitting the determination for the inclusion of the proposed block on the blockchain in view of the access results includes generating the determination based on whether the access results match the expected access results of the update condition.

Figure 5:
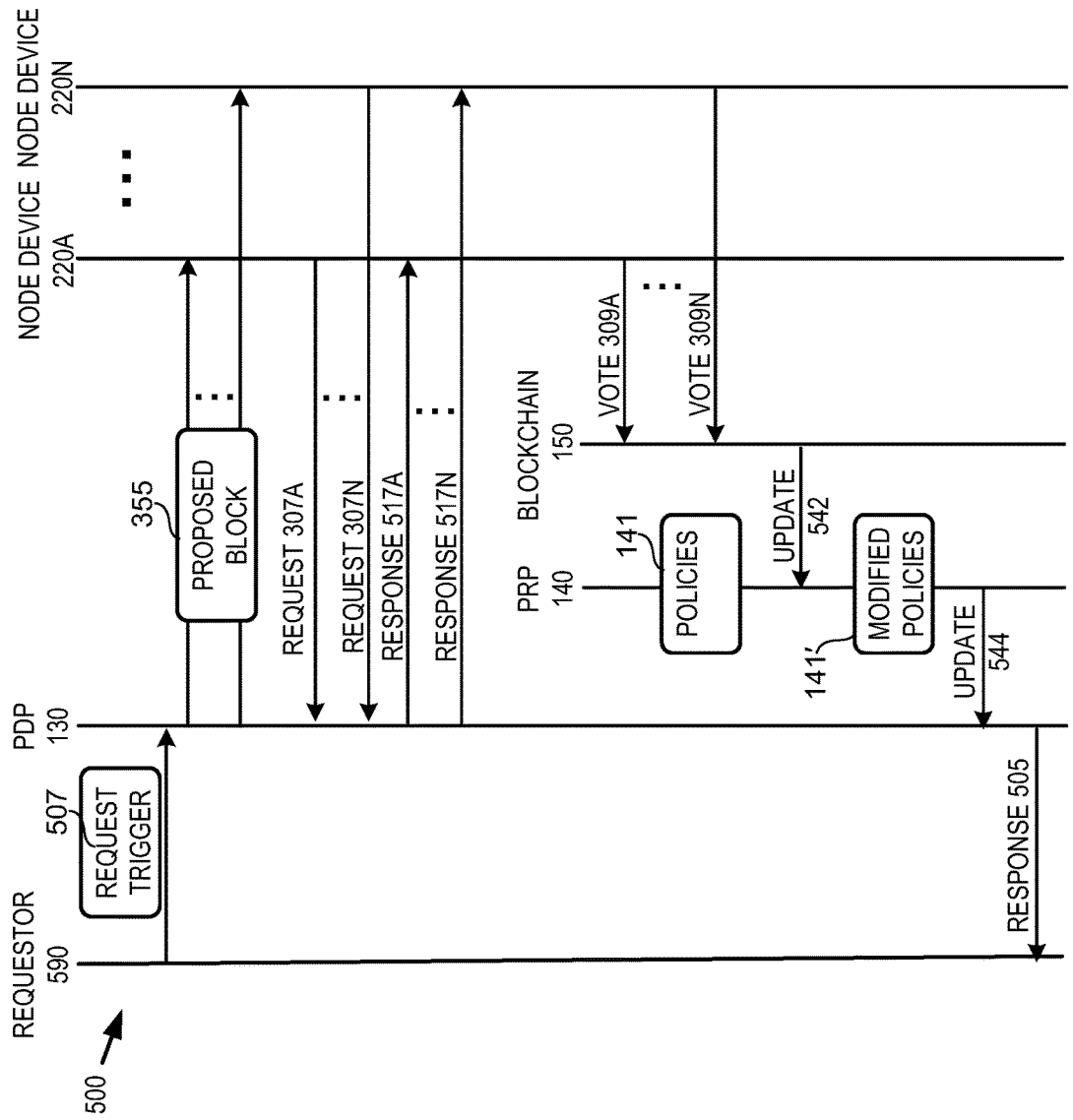
FIG. 5 is a signal flow diagram illustrating how the proposed contract block may be dynamically generated responsive to an access event, in accordance with one or more aspects of the disclosure.

FIG. 5 is a signal flow diagram illustrating how the proposed contract block 355 may be dynamically generated responsive to an access event, in accordance with one or more aspects of the disclosure. The flow diagram of FIG. 5 is schematic and is intended to illustrate representative elements that may be involved in dynamically generating a proposed contract block 355. Other, or different, elements may be involved without deviating from the scope of the present disclosure. Descriptions of elements of FIG. 5 that have been previously disclosed will not be repeated for brevity.

Referring to FIG. 5, an access architecture 500 may include a PDP server 130 and a plurality of node devices 220, each containing a copy of a blockchain 150. As described herein with respect to FIGS. 1-4, the PDP 130 may response to access requests, in part, by referring to PRP 140, which may contain an access policy (e.g., access control policy 141 described herein) that is based, in part, on contract blocks of the blockchain 150.

In some embodiments, a requestor 590 may generate a request trigger 507 in the access architecture 500. The request trigger 507 may indicate, for example, that a type of access, or a change in existing access, is requested. The request trigger 507 may be generated, for example, by the addition of a new user and/or a new role within the access architecture 500. In some embodiments, the request trigger 507 may be generated to remove access, such as when a user leaves the access architecture 500 or credentials of a user/role are otherwise demoted.

The request trigger 507 may be received by the PDP 130. Responsive to the request trigger 507, the PDP 130 may generate a proposed block 355, which may be a proposed contract block 355 as described herein. The contents of the proposed block 355 may include the proposed update to the access control policies 141 indicated by the request trigger 507. For example, the proposed update (e.g., proposed policy update 335 described herein) may include modifications to be made to the access control policies 141. The proposed block 355 may also include a plurality of update conditions (e.g., update conditions 330 described herein). The update conditions may indicate how the proposed update may be evaluated. In some embodiments, the PDP 130 (or other entity in the access architecture 500) may generate the update conditions based on an analysis of the access control policies 141 that are affected by the proposed update. The update conditions may identify particular node devices 220 that are to validate the proposed update. In some embodiments, the update conditions may include executable code that, when executed by one or more of the node devices, performs the validation of the proposed update by attempting an access to a modified version of the access control policies 141 that includes the proposed update.

The PDP 130 may transmit a plurality of the proposed blocks 355 to a plurality of the node devices 220. In FIG. 5, node devices 220A to 220N are illustrated as receiving the proposed blocks 355, but the embodiments of the present disclosure are not limited to this configuration. In some embodiments a same copy of the proposed block 355 is sent to each of the node devices 220A to 220N, but the embodiments of the present disclosure are not limited thereto. In some embodiments, a different version of the proposed block 355 may be sent to each of the node devices 220A to 220N. For example, different ones of the different versions of the proposed block 355 may include different update conditions for the validation of the proposed update. In some embodiments, the different update conditions may depend on the different node devices 220A to 220N receiving the proposed block 355, such as the credentials (see, e.g., credentials 310 of FIG. 3).

In response to receiving the proposed block 355, the node devices 220A to 220N may each perform one or more requests (illustrated as requests 307A to 307N in FIG. 5). The one or more requests 307A to 307N may include access requests to validate the proposed update. In some embodiments, the requests 307A to 307N may be made to a sandbox (e.g., temporary) copy of the access control policies 141 that include the proposed update as an addition to the access control policies 141. An example of such a sandbox copy is the PDP sandbox 338 described herein with respect to FIG. 3. Though FIG. 5 illustrates the requests 307A to 307N being directed to the PDP 130, this is merely an example. In some embodiments, the temporary copy of the access control policies 141 that include the proposed update may be provided by another entity in the access architecture 500, such as the PEP 120 (see FIG. 1), the PRP 140, or another device/system within the access architecture 500.

In response to the requests 307A to 307N, the node devices 220A to 220N may receive responses 517A to 517N. The responses 517A to 517N may include permit or deny decisions on the access requests of the requests 307A to 307N. The node devices 220A to 220N may evaluate the permit or deny decisions of the responses 517A to 517N to determine if they match the update conditions of the proposed block 355. In response to the evaluation, the node devices 220A to 220N may transmit votes 309A to 309N as to whether the proposed block 355 should be included in the blockchain 150. An example of the votes 309A to 309N is the inclusion determination 309 described herein with respect to FIG. 3. For example, if an individual response 517 matches the update condition of the proposed block 355 (e.g., provides the correct permit or deny decision), a respective node device 220 may vote to include the proposed block 355 on the blockchain 150. If an individual response 517 does not match the update condition of the proposed block 355 (e.g., provides an incorrect permit or deny decision), a respective node device 220 may vote to exclude the proposed block 355 from the blockchain 150.

If enough votes 309A to 309N are transmitted that determine that the proposed block 355 should be included on the blockchain 150, the proposed block 355 may be added to the blockchain 150. In some embodiments, the number of votes 309A to 309N that are needed to add a proposed block 355 to the blockchain 150 may be configurable, but may be 90% of the node devices 220A to 220N, or more.

In some embodiments, if the proposed block 355 is added to the blockchain 150, an update indication 542 may be provided to the PRP 140. The update indication 542 may indicate that the blockchain 150 has been updated. In response to the update indication 542, the access control policies 141 of the PRP 140 may be updated. As a result, modified access control policies 141' may be generated. The modified access control policies 141' may include the proposed update that resulted from the request trigger 507. In some embodiments, the access control policies 141 of the PRP 140 may be accessed directly from the blockchain 150. In such embodiments, the update indication 542 may be optional.

In some embodiments an additional update indication and/or response 544 may be transmitted to the PDP 130 to indicate that the modified access control policies 141' are available. In response to the modified access control policies 141', the PDP 130 may evaluate the request trigger 507, which may be a request for access to a resource, in light of the modified access control policies 141' to generate a response 505. The PDP 130 may provide a response to the request trigger 507 based on the modified access control policies 141'. The response 505 may be, for example, a grant or deny decision to an access request to a resource that prompted the request trigger 507. In some embodiments, the additional update indication and/or response 544 may be optional.

The access architecture 500 illustrated in FIG. 5 provides a mechanism for dynamically updating a set of access control policies 141 used for access control. The dynamic update avoids the various types of offline analyses that might conventionally need to be performed for a modification to be made to a set of access policies. By using dynamic validations of the changes to the access control policies 141, the embodiments of the present disclosure provide a way to validate that the changes will not have unintended consequences, while still being responsive to the original request. In addition, some embodiments of the present disclosure allow for the capability of having both the changes to the access control policies 141 and the validations that were provided against these changes visible, trackable, and immutable in the blockchain 150. This increases transparency and auditability of both the changes to the access control policies 141 as well as the mechanisms used to validate those changes.

Figure 6:
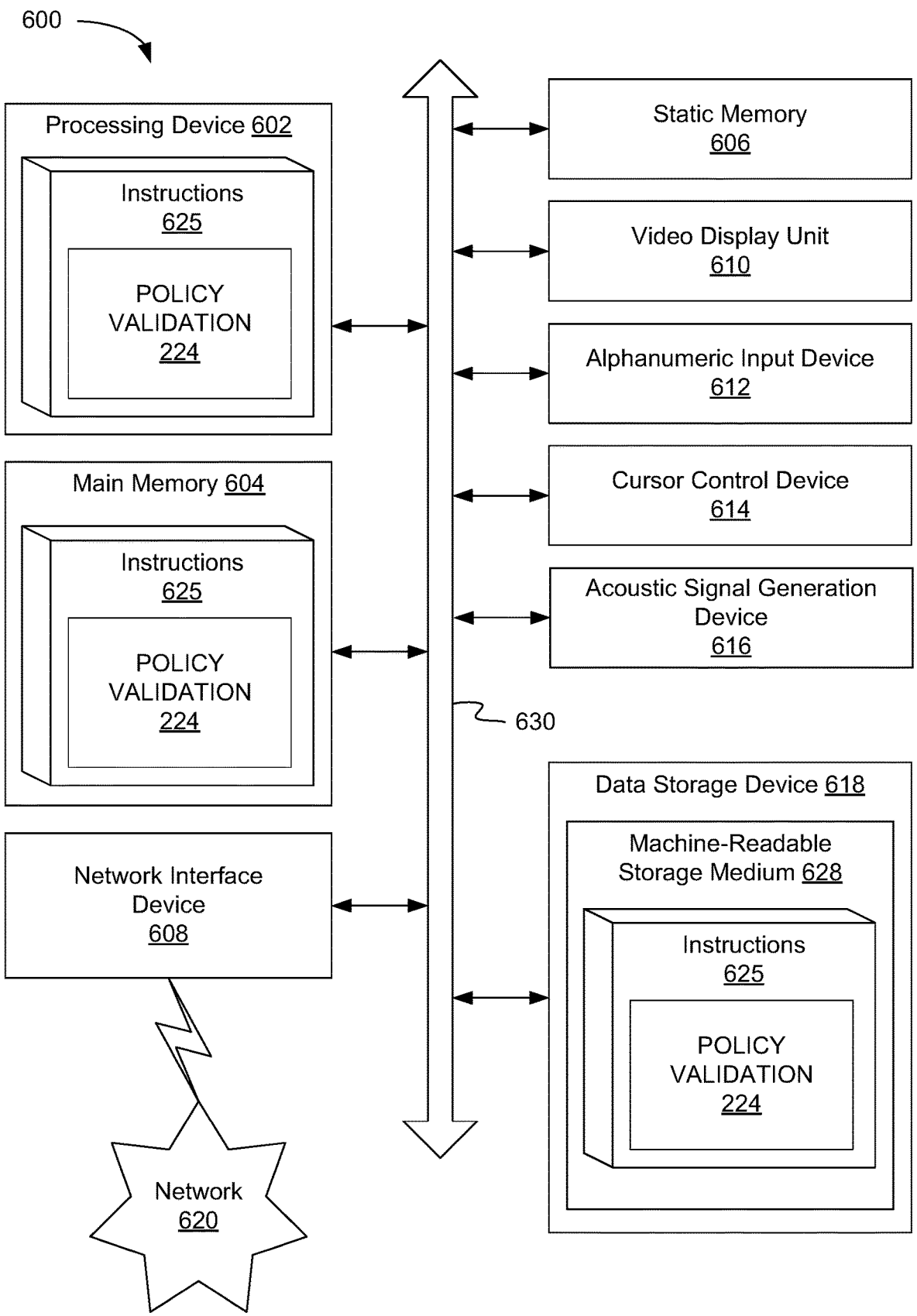
FIG. 6 is a block diagram of an example apparatus that may perform one or more of the operations described herein, in accordance with one or more aspects of the disclosure.

FIG. 6 is a block diagram of an example computing device 600 that may perform one or more of the operations described herein, in accordance with one or more aspects of the disclosure. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also include one or more special-purpose processing devices such as an application specific integrated circuit (ASIC), a field programmable gate array (FPGA), a digital signal processor (DSP), network processor, or the like. The processing device 602 may execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 625 that may include instructions for a service configuration component, e.g., security monitor 162 for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "determining," "identifying," "disrupting," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/ component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of access control comprising:
receiving a proposed block for inclusion on a blockchain, the proposed block comprising a proposed update to an access control policy and an update condition for evaluating the proposed update, wherein the update condition of the proposed block comprises executable code to generate an access request;
transmitting, by a processing device, the access request to a host device of the access control policy, wherein the access request is evaluated by the host device according to a modified version of the access control policy that incorporates the proposed update to generate access results; and
transmitting a determination for the inclusion of the proposed block on the blockchain in view of the access results.

2. The method of claim 1, further comprising:
updating the proposed block with the access results.

3. The method of claim 1, wherein the access request is generated according to the update condition of the proposed block.

4. The method of claim 1, wherein the update condition of the proposed block comprises expected access results, and
wherein transmitting the determination for the inclusion of the proposed block on the blockchain in view of the access results comprises generating the determination based on whether the access results match the expected access results of the update condition.

5. The method of claim 1, wherein transmitting, by the processing device, the access request comprises transmitting the access request to a server that compares the access request to the modified version of the access control policy that incorporates the proposed update.

6. The method of claim 1, wherein the proposed block for inclusion on the blockchain is dynamically generated responsive to an access event that requests a modification to the access control policy.

7. An apparatus comprising:
a memory; and
a processing device, operatively coupled to the memory, to:
receive a proposed block for inclusion on a blockchain, the proposed block comprising a proposed update to an access control policy and an update condition for evaluating the proposed update, wherein the update condition of the proposed block comprises executable code to generate an access request;
transmit the access request to a host device of the access control policy, wherein the access request is evaluated by the host device according to a modified version of the access control policy that incorporates the proposed update to generate access results; and
transmit a determination for the inclusion of the proposed block on the blockchain in view of the access results.

8. The apparatus of claim 7, wherein the processing device is further to:
update the proposed block with the access results.

9. The apparatus of claim 7, wherein the access request is generated according to the update condition of the proposed block.

10. The apparatus of claim 7, wherein the update condition of the proposed block comprises expected access results, and
wherein to transmit the determination for the inclusion of the proposed block on the blockchain in view of the access results, the processing device is to generate the determination based on whether the access results match the expected access results of the update condition.

11. The apparatus of claim 7, wherein to transmit the access request, the processing device is to transmit the access request to a server that compares the access request to the modified version of the access control policy that incorporates the proposed update.

12. The apparatus of claim 7, wherein the proposed block for inclusion on the blockchain is dynamically generated responsive to an access event that requests a modification to the access control policy.

13. A non-transitory computer-readable storage medium comprising instructions that, when executed by a processing device, cause the processing device to:
receive a proposed block for inclusion on a blockchain, the proposed block comprising a proposed update to an access control policy and an update condition for evaluating the proposed update, wherein the update condition of the proposed block comprises executable code to generate an access request;
transmit, by the processing device, the access request to a host device of the access control policy, wherein the access request is evaluated by the host device according to a modified version of the access control policy that incorporates the proposed update to generate access results; and
transmit a determination for the inclusion of the proposed block on the blockchain in view of the access results.

14. The non-transitory computer-readable storage medium of claim 13, wherein the processing device is further to:
update the proposed block with the access results.

15. The non-transitory computer-readable storage medium of claim 13, wherein the access request is generated according to the update condition of the proposed block.

16. The non-transitory computer-readable storage medium of claim 13, wherein the update condition of the proposed block comprises expected access results, and
wherein to transmit the determination for the inclusion of the proposed block on the blockchain in view of the access results, the processing device is to generate the determination based on whether the access results match the expected access results of the update condition.

17. The non-transitory computer-readable storage medium of claim 13, wherein to transmit the access request, the processing device is to transmit the access request to a server that compares the access request to the modified version of the access control policy that incorporates the proposed update.

\* \* \* \* \*